(12) United States Patent
Timmerman et al.

(10) Patent No.: US 12,491,577 B2
(45) Date of Patent: Dec. 9, 2025

(54) PROTECTION SYSTEM FOR LASER CUTTING MACHINE

(71) Applicant: Mestek Machinery, Inc., Westfield, MA (US)

(72) Inventors: Bryan J. Timmerman, Lake Villa, IL (US); Cody Umberger, Oak Ridge, NJ (US)

(73) Assignee: Mestek Machinery, Inc., Westfield, MA (US)

( * ) Notice: Subject to any disclaimer, the term of this patent is extended or adjusted under 35 U.S.C. 154(b) by 29 days.

(21) Appl. No.: 16/444,318

(22) Filed: Jun. 18, 2019

(65) Prior Publication Data

US 2019/0299330 A1 Oct. 3, 2019

Related U.S. Application Data

(63) Continuation-in-part of application No. 15/905,957, filed on Feb. 27, 2018, now abandoned, which is a
(Continued)

(51) Int. Cl.
*B23K 26/12* (2014.01)
*B23K 26/18* (2006.01)
*B23K 26/70* (2014.01)

(52) U.S. Cl.
CPC ............ *B23K 26/128* (2013.01); *B23K 26/18* (2013.01); *B23K 26/706* (2015.10)

(58) Field of Classification Search
CPC .. B23K 26/706; B23K 26/38; B23K 37/0235; B23K 26/1462; B23K 26/0876; B23K 26/127; B23K 37/006; B23K 37/0408; B23K 37/0461; B23K 10/00; B23K 2101/18; B23K 26/128; B23K 26/14; B23K 26/147; B23K 26/1488; B23K 26/18; F16P 1/02; F16P 1/06
(Continued)

(56) References Cited

U.S. PATENT DOCUMENTS

| 3,720,836 A | 3/1973 | Donges et al. |
| 5,442,154 A | 8/1995 | Philippe et al. |

(Continued)

FOREIGN PATENT DOCUMENTS

| CN | 201236276 | 5/2009 |
| CN | 102112267 | 6/2011 |

(Continued)

OTHER PUBLICATIONS

JP H1120921 A (Year: 1999).*
(Continued)

*Primary Examiner* — Vy T Nguyen
(74) *Attorney, Agent, or Firm* — Grogan, Tuccillo & Vanderleeden, LLP

(57) ABSTRACT

A laser cutting tool with protective enclosure assembly for manipulating a workpiece on a movable platen includes a frame, a top protection assembly, a middle protection shield, a bottom protection assembly and a laser torch head. The top protection assembly, middle protection assembly, and bottom protection assembly are removably mounted to the frame such that they form a cavity enclosing only substantially the laser torch head.

14 Claims, 14 Drawing Sheets

Related U.S. Application Data continuation-in-part of application No. 15/403,450, filed on Jan. 11, 2017, now Pat. No. 10,807,200.

(60) Provisional application No. 62/277,594, filed on Jan. 12, 2016.

(58) Field of Classification Search
USPC .......................................... 219/68; 198/341
See application file for complete search history.

(56) References Cited

U.S. PATENT DOCUMENTS

| | | | | |
|---|---|---|---|---|
| 5,940,304 | A * | 8/1999 | Barenboim | G11B 5/8404 700/220 |
| 6,246,025 | B1 | 6/2001 | Scott | |
| 2008/0017620 | A1 | 1/2008 | Sukhman et al. | |
| 2008/0089382 | A1* | 4/2008 | Eigler | B23K 26/704 372/100 |
| 2008/0210516 | A1* | 9/2008 | Blaser | B23K 26/702 198/341.05 |
| 2008/0314875 | A1* | 12/2008 | Yamaguchi | B23K 10/00 219/68 |
| 2009/0045175 | A1 | 2/2009 | Nishihara et al. | |
| 2010/0084385 | A1* | 4/2010 | Zeygerman | B23K 26/706 219/121.78 |
| 2010/0193402 | A1 | 8/2010 | Li et al. | |
| 2014/0209585 | A1 | 7/2014 | Siewert et al. | |
| 2014/0231398 | A1 | 8/2014 | Land et al. | |
| 2014/0353293 | A1 | 12/2014 | Huonker et al. | |
| 2015/0176763 | A1 | 6/2015 | Bunz et al. | |
| 2015/0190886 | A1 | 7/2015 | Huonker | |
| 2017/0106475 | A1 | 4/2017 | Mikkelsen et al. | |
| 2017/0197280 | A1 | 7/2017 | Timmerman et al. | |
| 2017/0200839 | A1 | 7/2017 | Nakano et al. | |
| 2018/0200839 | A1 | 7/2018 | Timmerman et al. | |

FOREIGN PATENT DOCUMENTS

| | | |
|---|---|---|
| CN | 203045165 | 7/2013 |
| CN | 203045165 U | 7/2013 |
| CN | 205798731 U | 12/2016 |
| CN | 208644430 U | 7/2018 |
| CN | 208289249 U | 12/2018 |
| CN | 109877476 A | 6/2019 |
| DE | 19636458 C1 | 4/1998 |
| DE | 19839482 A1 | 12/2014 |
| DE | 102013220732 A1 | 4/2015 |
| EP | 2130639 A1 | 12/2009 |
| JP | 60118397 A | 11/1983 |
| JP | H09 66386 | 3/1997 |
| JP | 9-99385 | 4/1997 |
| JP | 10-193160 | 7/1998 |
| JP | 2006 315356 | 11/2006 |
| JP | 2011 121107 | 6/2011 |
| RU | 2032514 | 4/1995 |
| RU | 2032514 C1 | 4/1995 |
| RU | 2090328 | 9/1997 |
| RU | 2095431 | 11/1997 |
| RU | 2288825 | 12/2006 |
| RU | 76272 | 9/2008 |
| RU | 2468903 | 12/2012 |
| SU | 185634 | 8/1966 |
| SU | 194997 | 4/1967 |
| SU | 659827 | 4/1979 |
| WO | 2014165281 A1 | 10/2014 |
| WO | 2017123590 | 7/2017 |

OTHER PUBLICATIONS

Extended EP Search Report issued in corresponding EP Patent Application No. 19171589.5 dated May 26, 2020.
Partial Supplementary European Search Report dated Sep. 10, 2019 issued in corresponding EP Application No. 17738833.7.
Office Action dated Dec. 23, 2019 from corresponding Russian Patent Application No. 2019108659/02.
Corresponding Russian Office Action dated Nov. 26, 2020.
Corresponding European Search Report dated Dec. 4, 2020.
Corresponding European Search Report dated Dec. 3, 2020.
Corresponding European Search Report dated Dec. 2, 2020.
Chinese Office Action dated Jul. 5, 2019 issued in corresponding CN Patent Application No. 2017800052741.
Corresponding Australian Reexam Report dated Jun. 11, 2021.
Corresponding Chinese Application No. 202010561816.7 Office Action dated Dec. 10, 2021 with English Translation.

* cited by examiner

PROTECTION SYSTEM FOR LASER CUTTING MACHINE

CROSS-REFERENCE TO RELATED APPLICATIONS

This application is a continuation-in-part of, and claims the benefit of, U.S. application Ser. No. 15/905,957, filed on Feb. 27, 2018, which is a continuation-in-part of U.S. application Ser. No. 15/403,450, filed on Jan. 11, 2017 and which claims the benefit of U.S. Provisional Application Ser. No. 62/277,594, filed on Jan. 12, 2016, each of the foregoing applications being hereby incorporated by reference herein in their entireties.

FIELD OF THE INVENTION

The present invention relates generally to a protection system and more particularly, to a protection system for a laser cutting machine.

BACKGROUND OF THE INVENTION

Laser cutting is a technology that uses a laser to cut materials, and is typically used for industrial manufacturing applications. Laser cutting works by directing the output of a high-power laser most commonly through optics. A laser cutting machine features a cutting head generating a laser beam that moves in both of the horizontal dimensions over a workpiece loading onto a table. The focused laser beam is directed to the workpiece, part of which is then melted, burns, and vaporizes away. A cut edge with a high-quality surface finish is therefore created.

Lasers enclosed in the laser cutting machines are capable of emitting high levels of energy and can therefore be dangerous to the eyes and skin of its operator. The use of the laser cutting machine can also impose a number of hazards including toxic gases and fumes and inhalable particles. Moreover, the possible random reflection of the laser light may burn the retina of an operator when the laser initially pierces the workpiece, Therefore, coupling a protective enclosure apparatus to a laser cutting machine is essential to the safe operation of the machine.

Most existing protective enclosures cover the entire laser cutting machine and thereby form a chamber. This not only results in a bulky machine, but also requires a pallet shuttle system to be installed onto the laser cutting machine for loading and unloading the workpiece into the chamber. This solution drives up the financial cost as well as the operation time of the laser cutting machine.

There therefore exists a need within the industry for the ability to increase the effectiveness of a protection system for the laser cutting machine, while avoiding the abovementioned drawbacks of known protective enclosure apparatuses.

SUMMARY OF THE INVENTION

With the forgoing concerns and needs in mind, it is the general object of the present invention to provide a protection system.

It is another object of the present invention to provide a protection system for a laser cutting machine.

It is another object of the present invention to provide a protection system for a laser cutting machine that permits the operator of the laser cutting machine to directly load and unload the workpiece onto and off the table without having to wait for the pallet shuttle to exit a typical protective enclosure apparatus.

It is another object of the present invention to provide a protection system for a laser cutting machine that allows the coil feeding of the workpiece directly onto the table at a reasonable financial cost.

It is another object of the present invention to provide a protection system for a laser cutting machine having a guard surrounding only the laser torch head, which therefore reduces the overall size of the laser cutting machine.

It is another object of the present invention to provide a protection system for a laser cutting machine that minimizes light reflection from the laser torch head.

These and other objectives of the present invention, and their preferred embodiments, shall become clear by consideration of the specification, claims and drawings taken as a whole.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
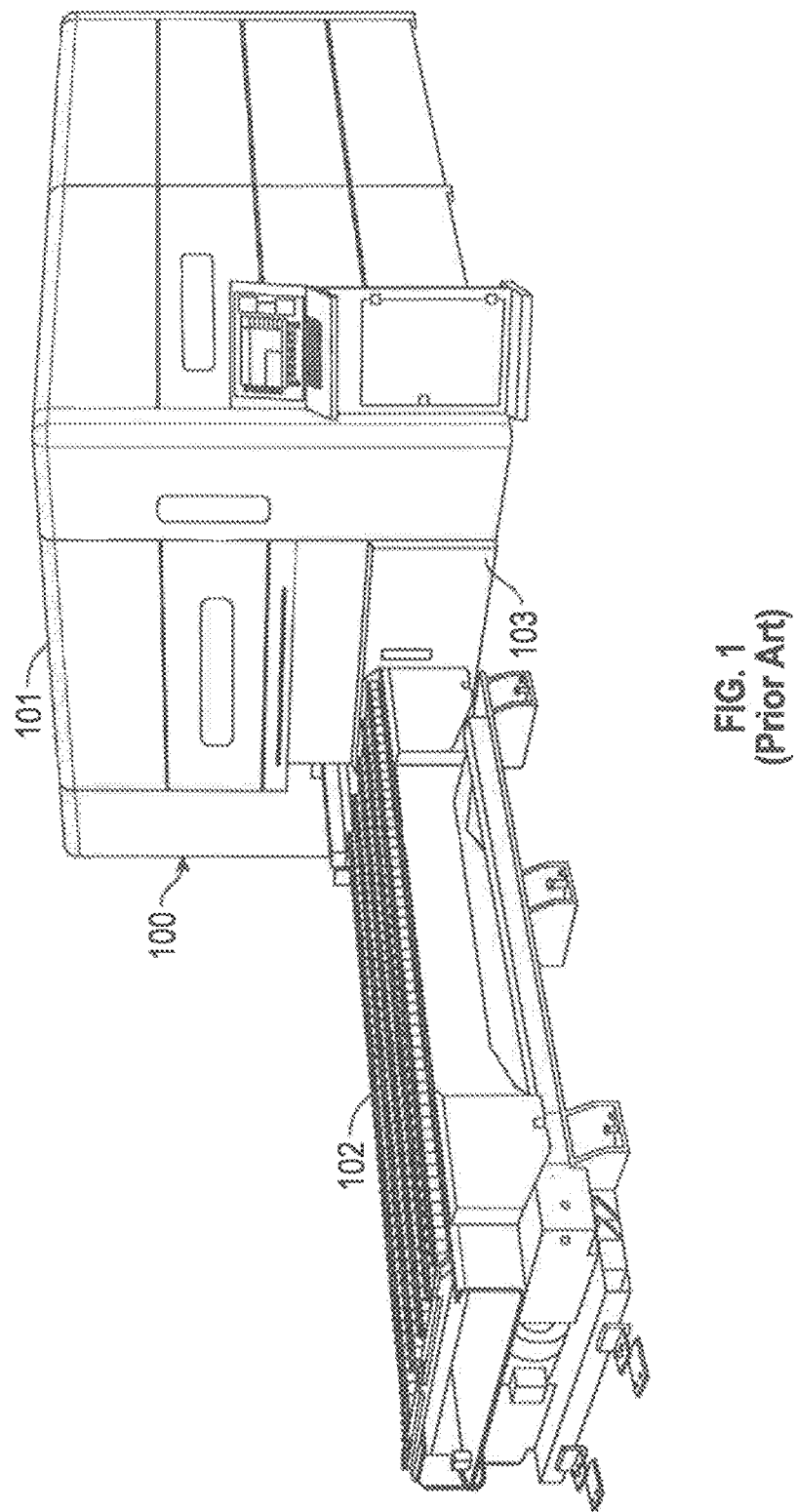
FIG. 1 illustrates a diagram of a prior art laser cutting machine, according to one embodiment of the present invention.

FIG. 1 illustrates an isomeric side view of a workpiece manipulation apparatus having a laser cutting machine, and its protective enclosure apparatus 100. A cutting laser (not shown) is positioned inside a protective enclosure apparatus 101. A pallet shuttle 102 locates in close association with the protective enclosure apparatus 101. A workpiece can be loaded and unloaded onto and off the pallet shuttle 102. The pallet shuttle 102 then carriers the loaded workpiece, enters into and exits the protective enclosure apparatus 101 through a protective enclosure apparatus enclosure door 103. In particular, to load and unload the workpiece to be processed by the laser cutting machine onto the pallet shuttle 102, the pallet shuttle 102 must exit the protective enclosure apparatus 101.

It will therefore be readily appreciated that known laser enclosures require enclosing the totality, or a great degree, of the workpiece manipulation apparatus itself, which is both expensive and cumbersome. When the workpiece and (preferably, movable) platen upon which it is transported are both captured inside the laser enclosure, as with the known apparatus shown in FIG. 1, efficiencies are lost due to excessive set-up time and expense, as well as making the workpiece and cutting laser largely inaccessible without undue stoppage and shutdown of the apparatus as a whole.

Figure 2:
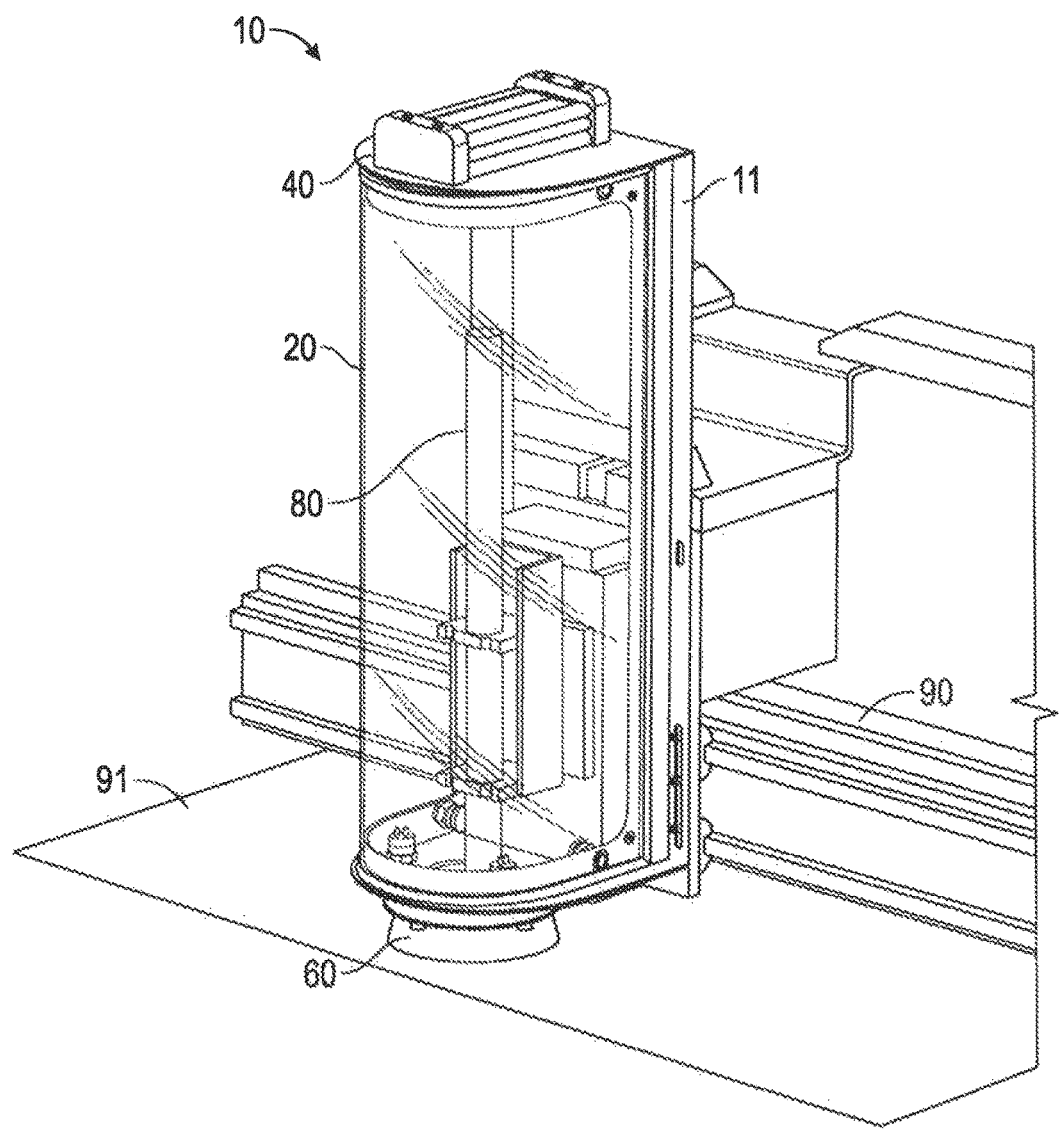
FIG. 2 illustrate an isomeric, side view of a protection system, according to one embodiment of the present invention.

FIG. 2 illustrates an isomeric, side view of a protection system 10, according to one embodiment of the present invention. In particular, FIG. 2 illustrates the protection system 10, as integrated with a laser torch head 80, a bridge 90 for supporting the laser torch head, and a workpiece 91 being processed. As it will be appreciated, the laser torch head 80, the bridge 90 and the workpiece 91 are only partially shown in FIG. 2, so as to permit illustration of the protection system itself, and its preferred placement with respect to the bridge 90, the laser torch head 80 and the workpiece 91.

While the present invention is being described in connection with the bridge 90 and the laser torch head 80 shown in FIG. 2, it will be readily appreciated by one of ordinary skill in the art that the present protection system 10 could be integrated into any laser cutting head, regardless of the specific type of the same, without departing from the broader aspects of the present invention.

As most clearly shown in FIG. 2, the protection system 10 of the present invention is moveably mounted to the bridge 90 so as to move therealong. The bridge 90 itself is adapted to move in a direction perpendicular to the moving direction of the protection system 10, so as to cut the workpiece 91, as desired. Additionally, the protection system 10 is designed such that the laser cutting head can be mounted on a motorized actuator inside the protection system 10 allowing the laser cutting head to be raised or lowered automatically for the purpose of focusing the laser beam or to accommodate slight variations in thickness of the material to be cut without affecting the position or downward force of the brush guard on the material being cut. This enclosed motorized actuator reduces the risk of accidental exposure of the laser light.

The protection system 10 includes a frame 11, a top protection assembly 40, a middle protection shield 20, and a bottom protection assembly 60, thereby forming a cavity where a laser torch head 80 locates, so as to prevent the escaping of reflected laser light when the laser torch head 80 cuts the workpiece 91.

As will be appreciated, and in stark contrast to the enclosure of the apparatus shown in FIG. 1, it is an important aspect of the present invention that it is only the laser head 80 itself, which is enclosed by top, middle and bottom assemblies, 40, 20 and 60 respectively. Thus, the protection system/enclosure of the present invention does not extend to the apparatus as a whole, nor does the enclosure encompass the movable platen upon which the workpiece is arranged.

Figure 3:
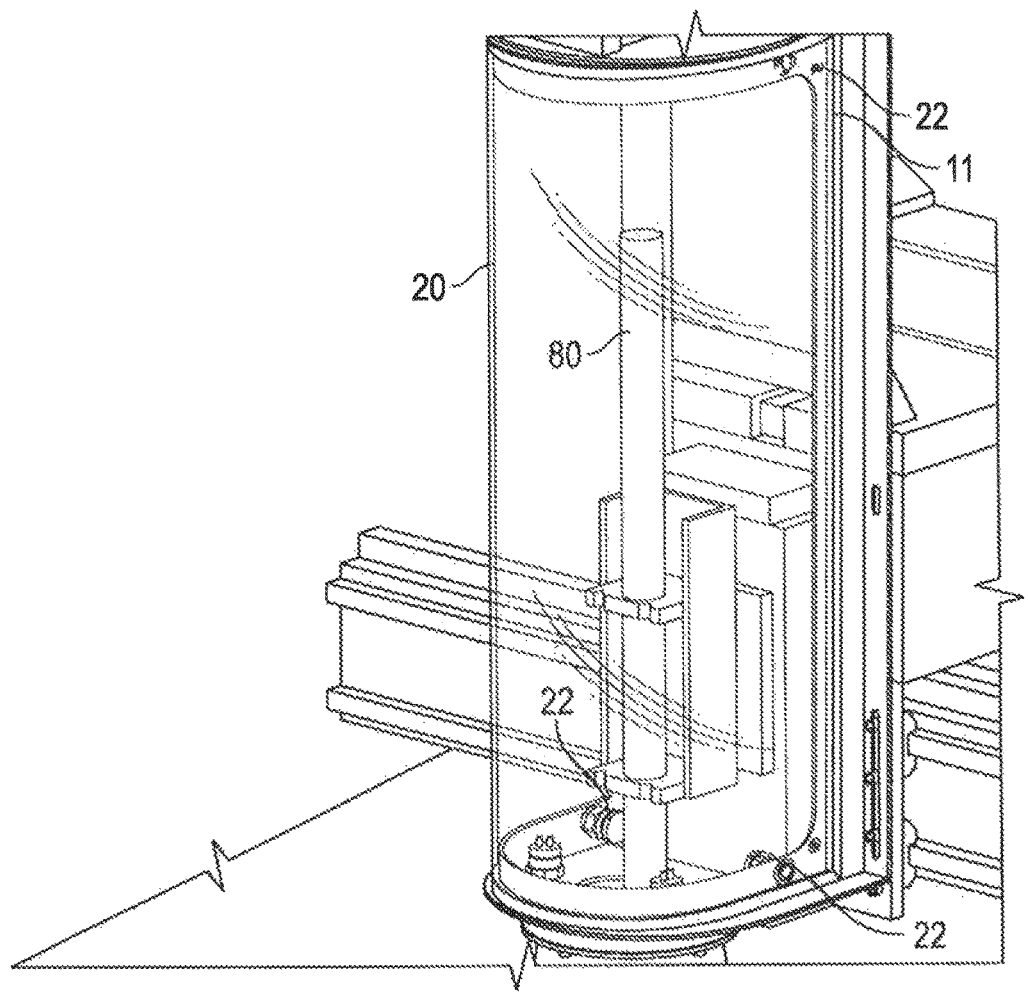
FIG. 3 is an enlarged view of the protection system, shown in FIG. 2, according to one embodiment of the present invention.
Figure 4:
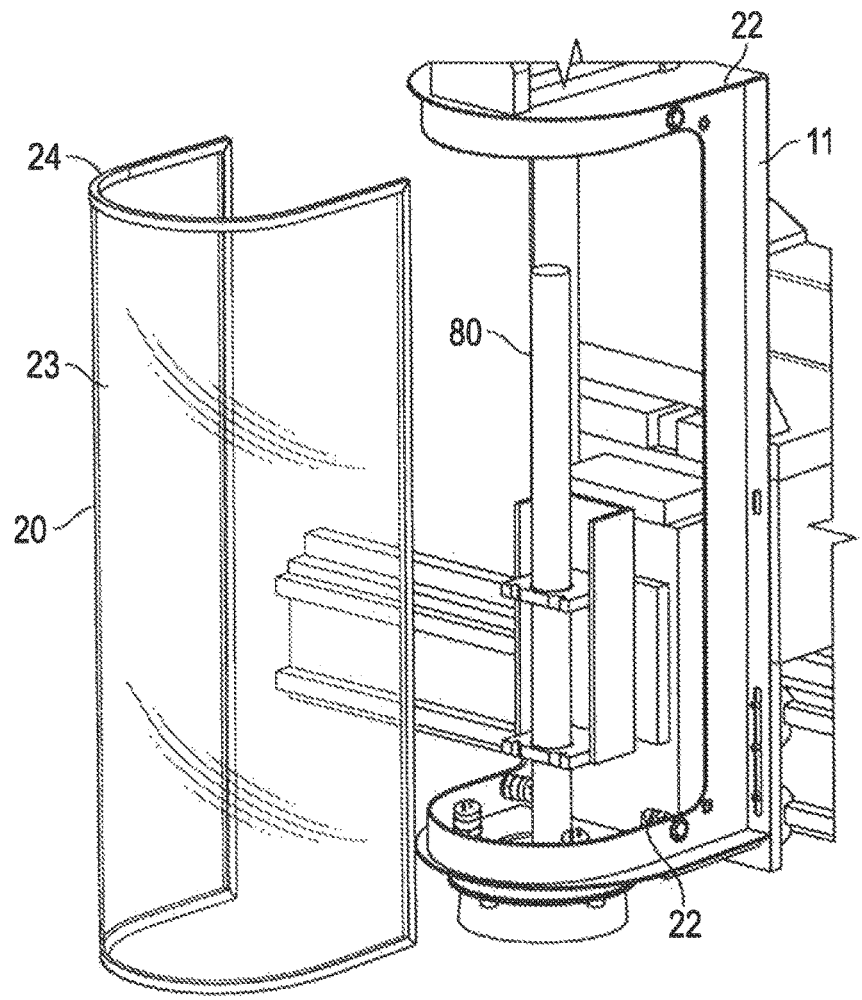
FIG. 4 illustrates the protection system of FIGS. 2 and 3 as a middle protection screen is detached from the protection system, according to one embodiment of the present invention.

Turning now to FIGS. 3 and 4, in combination, the middle protection shield assembly 20 of the protection system 10 is illustrated in more detail. A. light shield 23 is a preferably semi-translucent laser safe shield, so as to permit the operator of the laser cutting machine having a view of the inside of the cavity of the protection system 10, meanwhile prevents the reflected laser light escaping from the cavity. The light shield includes a planetary gasket 24. The light shield 23 is removably fixed to the frame 11 via four interlock switches 22 embedded in the frame 11. In alternative embodiments, the middle protection shield assembly 20 is mounted on hinges or vertical slides which are in conjunction with latches, the planetary gasket 24, and safety interlock switches 22, so as to allow interlocked access to the laser head for maintenance while preventing exposure of the laser by an operator.

In particular, the present invention envisions that the light shield 23 is preferably a Laservision P5P10 IR fiber laser safety window, for blocking various light rays across multiple spectrums, although other suitable shielding may be utilized without departing from the broader aspects of the present invention.

It should be noted that the light shield 23 must be secured to the frame 11 and the interlock switches 22 must be in contact with the light shield 23 in order for the laser torch head 80 to start working. Indeed, the there are several safety switches integrated with the light shield 23, all of which must be actuated in order for the laser head 80 to be permitted to operate.

As shown, FIG. 3 illustrates the middle protection shield 20 in an enclosed position. The light shield 23 is secured onto the frame 11 via four interlock (safety) switches 22. The interlock switches are in a locked position and therefore permits the laser torch head 80 to start working. FIG. 4, in contrast, illustrates the middle protection shield 20 in an opened position. The light shield 23 is removed from the frame 11. The interlock switches trip to an unlocked position upon the detaching of the light shield 23 from the frame 11. Therefore, the laser torch head 80 is unable to start working until the light shield 23 is secured to the frame 11 again.

The frame 11 is preferably welded so as to provide a continuous housing, thereby preventing radiation from escaping during operation of the laser head 80.

Figure 5:
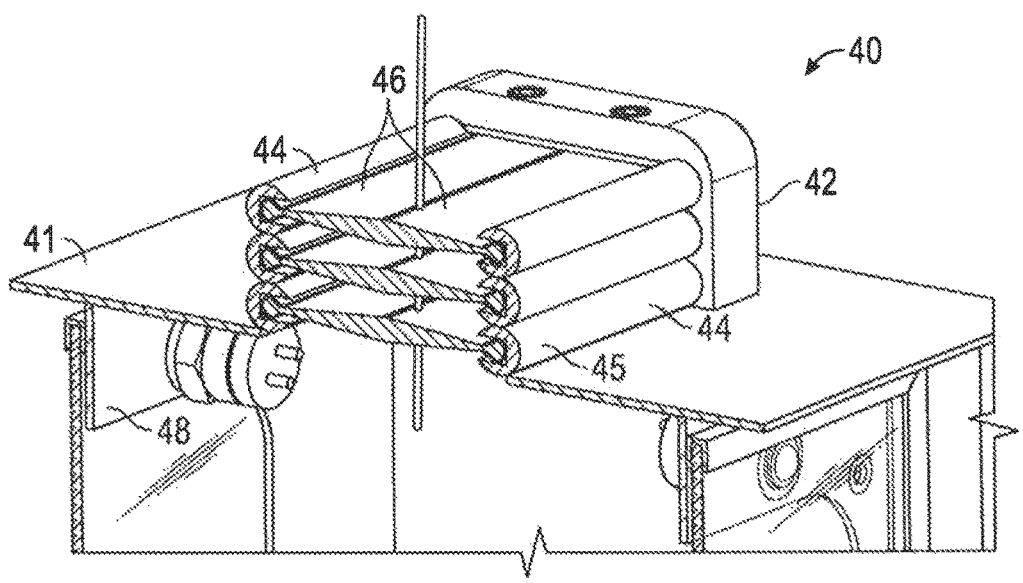
FIG. 5 illustrates an enlarged sectional view of a top brushes assembly according to one embodiment of the present invention.
Figure 6:
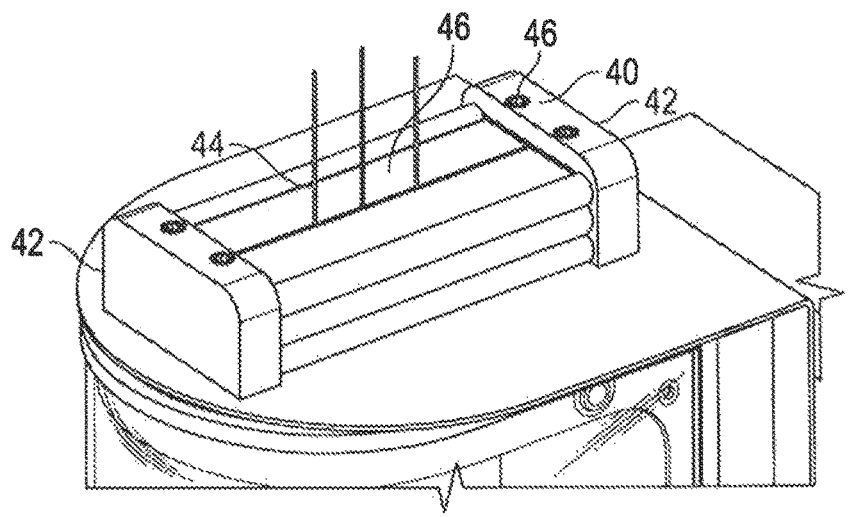
FIG. 6 illustrates an isomeric, side view of a top brushes assembly, according to one embodiment of the present invention.

FIGS. 5 and 6, in combination, illustrate a sectional view of the top protection assembly 40. In one preferred embodiment, the top protection assembly 40 includes a top support cover 41 having an opening, and at least brush assembly 44 positioned to cover the opening of the top support cover 41. The brush assembly is connected to the top support cover 41 via a bracket 42.

The brush assembly 44 includes one pair of brush holders 45 which are in connection with the bracket 42, and a pair of brushes 46, each of which comprises a plurality of brush bristles. One end of the brush 46 is received by the brush holder 45 in a brush socket. Two brushes in a pair are positioned in an opposite direction at the same vertical level, so as to permit the other ends of the two brushes to be facing and contacting each other. Therefore, the brushes assembly 44 prevents the reflected laser light from escaping the cavity from the top protection assembly 40, meanwhile permits any electrical cable, light cable or power cable connected to the laser torch head 80 to pass through the top protection assembly 40 and enter into the cavity. The cables therefore can move upward and/or downward freely without congesting the top protection assembly 40.

It shall be noted that in a preferred embodiment, three layers of the brushes assembly 44 are arranged vertically and connected to the bracket 42. However, any number of layers can be used to optimize the protection effect of the top protection assembly 40.

The top protection assembly 40 is connected to the frame 11 via two interlock (safety) switches 48. The two interlock switches 48 are in a locked position and permit the laser 80 to start working once the top protection assembly 40 is correctly fixed to the frame. However, if the top protection assembly 40 is removed, the two interlock switches 48 trip to an unlocked position and therefore prevent the laser torch head 80 from starting. In another embodiment, the top protection assembly 40 may include a solid assembly with the utilities passing through the guard assembly walls by means of bulkhead connectors and plugs, so as to enhance safety and/or provide a more tightly sealed chamber, which can be vented more effectively in the case of unpleasant or toxic fumes generated during the cutting process.

Figure 7:
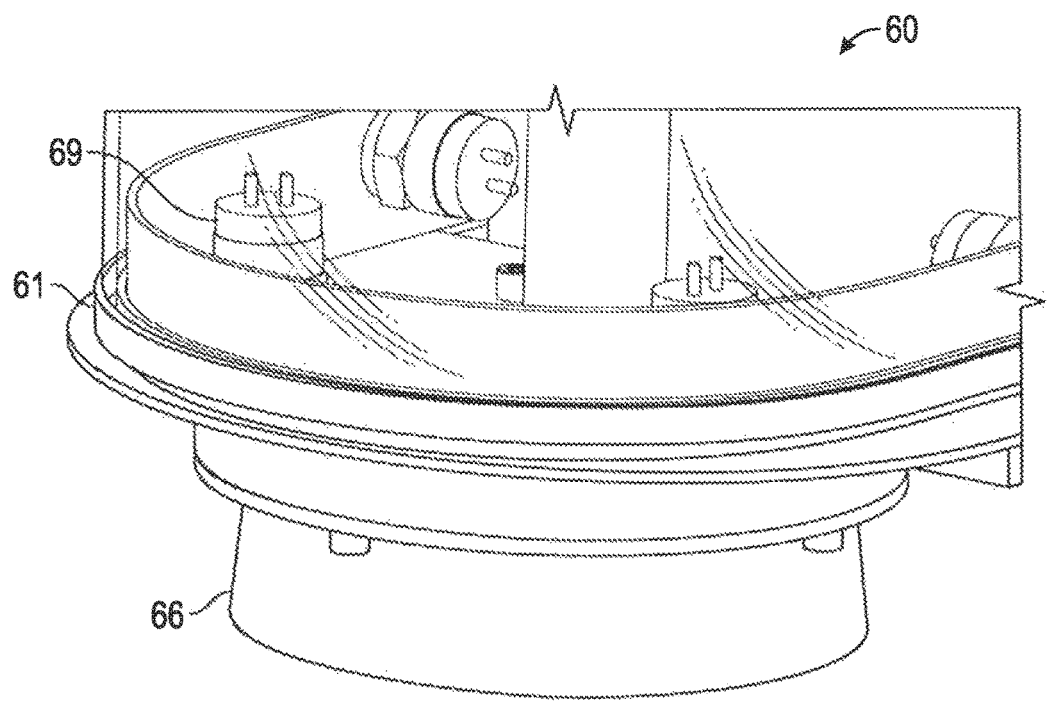
FIG. 7 illustrates an isomeric, side view of a bottom brushes assembly, according to one embodiment of the present invention.
Figure 8:
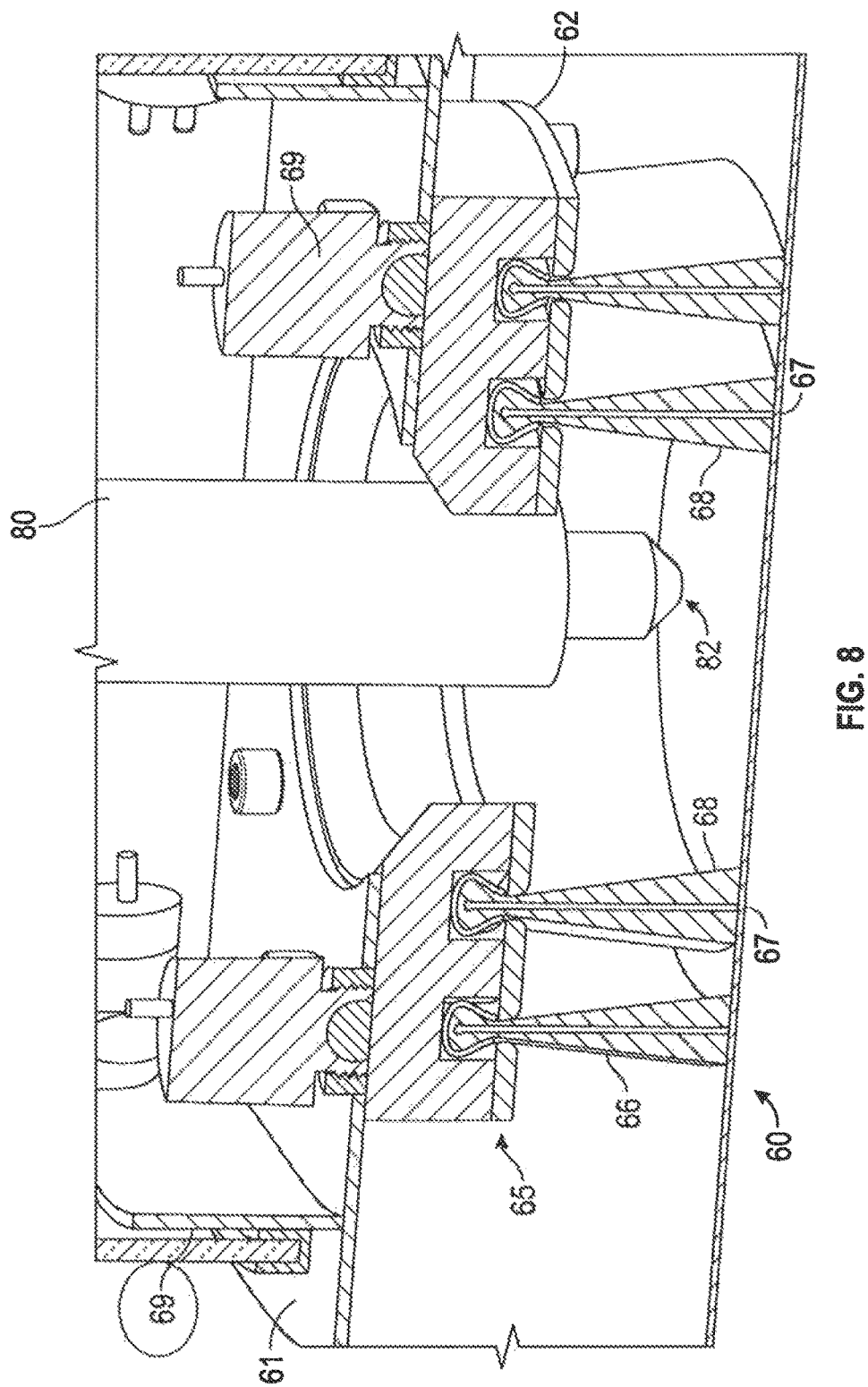
FIG. 8 illustrate an enlarged sectional view of a bottom brushes assembly, according to one embodiment of the present invention.

FIGS. 7 and 8, in combination, illustrate the bottom protection assembly 60. The bottom protection assembly 60 includes a bottom cover 61 having an opening to permit the laser torch head 80 extending therethrough and applying the laser light onto the workpiece 91 via a laser application tip unit 82. The bottom protection assembly 60 further includes a bottom brushes cup assembly 65. The bottom cup assembly 65 is arranged in a position relative to the opening on the bottom cover 61 so as to permit the operation of the laser torch head 80 on the workpiece 91.

The bottom brush cup assembly 65 includes a circular base 62 connected to the bottom cover 61 via two interlock switches 69. An opening in the center of the circular base 62 is matched with the opening on the bottom cover to permit the laser torch head extending therethrough. The circular base 62 has at least one socket in a circular shape for receiving an array of brushes 66 arranged in the same circular shape surrounding the central opening on the circular base 62. The brushes 66 are attached to the circular base 62 on one end, and extend downward with the other end of the brushes 66 directly contacting the workpiece 91 thereby ensures that the cavity of the protection system 10 is enclosed when the laser torch head 80 is performing cutting function on the workpiece 91.

As will be discussed in more detail later, the brushes 66 includes a solid rubber membrane 67(122) embedded between the bristles 68. It is yet another important aspect of the present invention that due to the specific use of the brushes 66 and how these bristles/brushes may be compressed to a degree, i.e., slightly bent, when in contact with a workpiece, the protection system 10 of the present invention effectively prevents the reflected laser light from escaping the cavity when the workpiece 91 moves in a vertical direction sporadically during the laser cutting process for the workpiece 91.

In one preferred embodiment, two arrays of brushes are arranged and received in two separate concentric circular sockets locate on the circular base. However, it should be noted that any number of array of brushes and the relevant receiving circular sockets can be arranged, so as to optimize the protection effect of the bottom protection assembly 60.

The circular base 62 is connected to the bottom cover 61 via two joints and two safety interlock switches 69. The two interlock switches 69 are in a locked position and permit the laser torch light 80 to start working once the bottom brushes cup assembly 65 is correctly fixed to the bottom cover 61. However, if the bottom brushes cup assembly 65 is removed, the two interlock switches 69 trip to an unlocked position and therefore prevent the laser torch head 80 from starting.

The safe operation of the laser head 80 is further increased by arranging a sensor (unillustrated) in the area of the base 62, for the purposes of detecting whether a workpiece is positioned adjacent the laser head 80. If the sensor does not detect a workpiece in the area adjacent to the laser head 80, the laser head 80 will not be permitted to operate. Preferably, the laser head 80 will be prevented from operating if the sensor does not detect a workpiece within approximately 1 mm below the laser head 80, although it will be readily appreciated that other distances may be instead utilized without departing from the broader aspects of the present invention.

Figure 9:
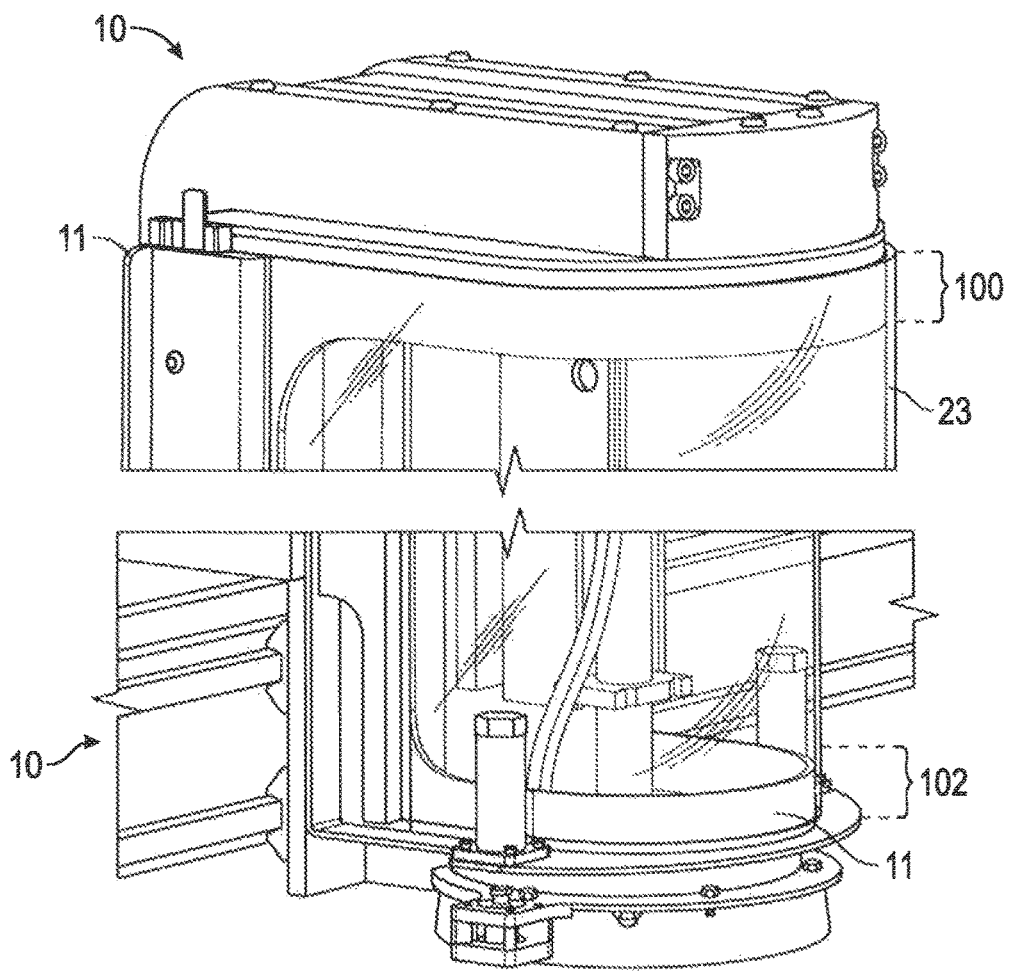
FIG. 9 illustrates a cut-away of the top and bottom portions of the protective enclosure according to one embodiment of the present invention.

FIG. 9 illustrates a cut-away of the top and bottom portions of the protective enclosure 10. As shown in FIG. 9, the light shield. 23 and frame 11 interact and are sized and positioned such that there is an overlap, 100/102, between a raised edge of the frame 11 and the light shield 23, thus ensuring that extraneous light from the laser head 80 does not escape the protective enclosure 10.

Figure 10:
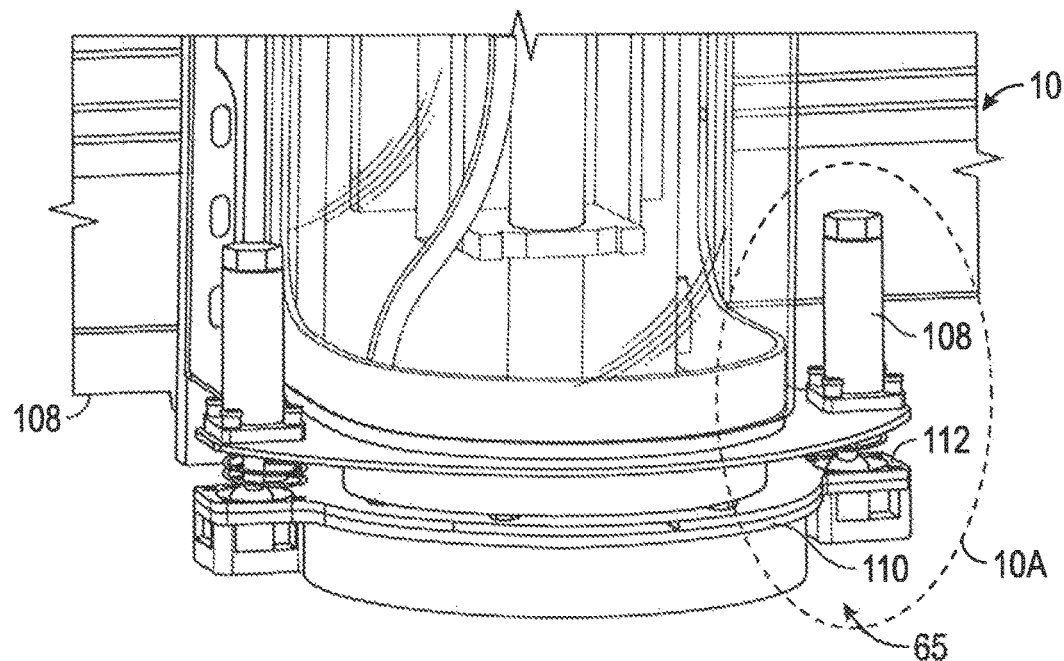
FIG. 10 shows an enlarged bottom portion of the protective enclosure, according to one embodiment of the present invention.
Figure 10A:
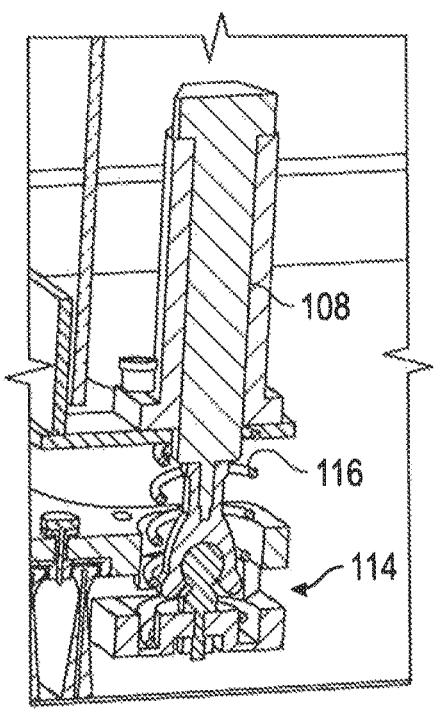
FIG. 10A is an enlarged, detailed cross-sectional view of area 10A of FIG. 10.

FIG. 10 shows an enlarged bottom portion of the protective enclosure 10, as well as a sectional view of one of a pair of spring-loaded bush biasing devices 108. As illustrated in FIG. 10, the bottom brush cup assembly 65 includes an upper mounting plate 110, which itself is releasably attached to a base mounting plate 112 that is operatively attached to the pair of spring-loaded brush biasing devices 108.

As will be appreciated, the spring-loaded brush biasing devices 108 include preferably an articulating ball joint 114 and a biasing spring/element 116. The biasing device 108 thereby act to allow the brush cup assembly 65 and integrated bristles to tilt freely while being constantly biased downwardly into contact with the workpiece below, thus accommodating and remaining in tight contact with the workpiece, regardless of differences or irregularities in the workpieces contour and/or slope. The ball joint 114 may comprise a magnetically coupled design to permit the brush biasing devices 108 to separate cleanly without causing permanent damage to the guard assembly in the case of a hard collision. The presence of the two safety interlock devices 69 will ensure deactivation of the laser in the case of a collision and subsequent separation of the ball joint 114.

Figure 11:
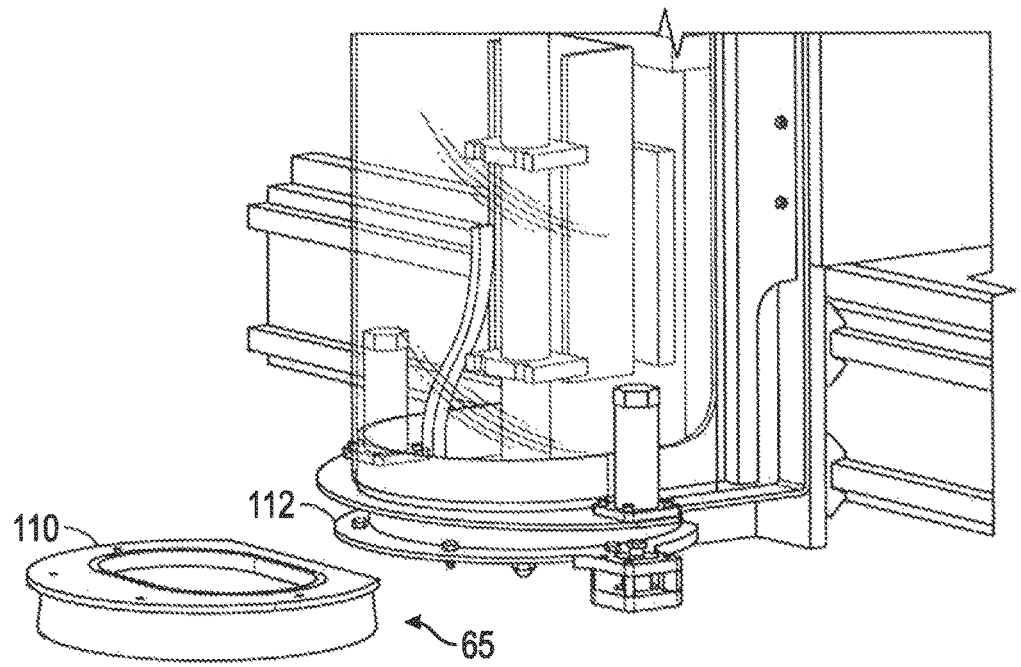
FIG. 11 illustrates the brush cup assembly as removed from integration with the lower part of the protective enclosure, according to one embodiment of the present invention.
Figure 12:
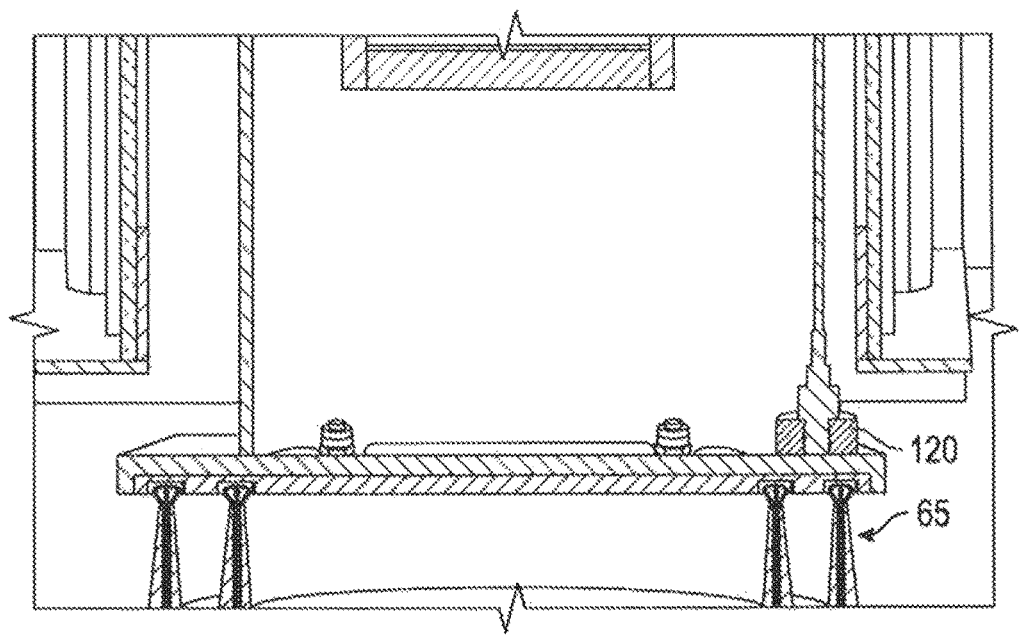
FIG. 12 illustrates a safety switch, according to one embodiment of the present invention.

As will be appreciated, the brush cup assembly will incur wear during use, and as such, is a consumable part which must be inspected and replaced from time to time. For its part, FIG. 11 illustrates the brush cup assembly as removed from integration with the lower part of the protective enclosure. As further shown in FIG. 12, a safety switch 120 may be integrated with the protective enclosure to detect the presence of the brush cup assembly 65. The safety switch 120 is preferably a compression limit type switch or coded RED switch, and is sensitive enough to determine when the bush cup 65 is not engaged or is improperly installed or becomes loose, although other types of sensors and switches may be utilized for this purpose without departing from the broader aspects of the present invention. If the safety switch 120 does not detect the existence and proper installation of the bush cup assembly 65, the laser head 80 would be prohibited from operation.

Figure 13:
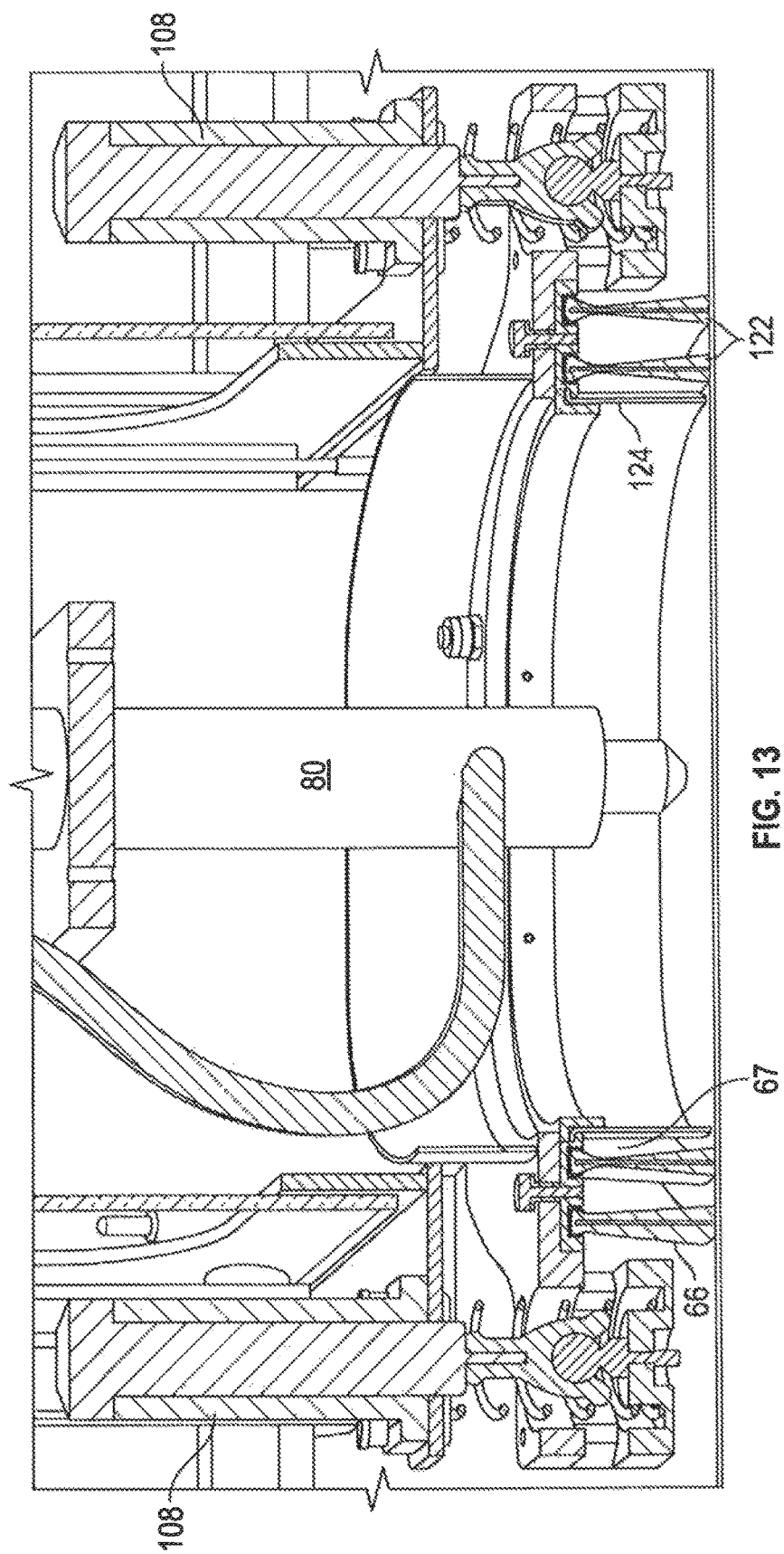
FIG. 13 illustrates a close-up sectional view of the bottom protection assembly, according to one embodiment of the present invention.

As discussed previously, the protective enclosure of the present invention includes many features that make the safe operation of the laser head 80 possible. FIG. 13 illustrates a close-up sectional view of the bottom protection assembly 60. As shown in FIG. 13, and in a preferred embodiment, the bush cup assembly 65 includes two concentrically aligned brushes/brush rings 66, each of which includes a solid rubber membrane 122 embedded within each of the concentrically aligned brush rings 66.

Figure 14:
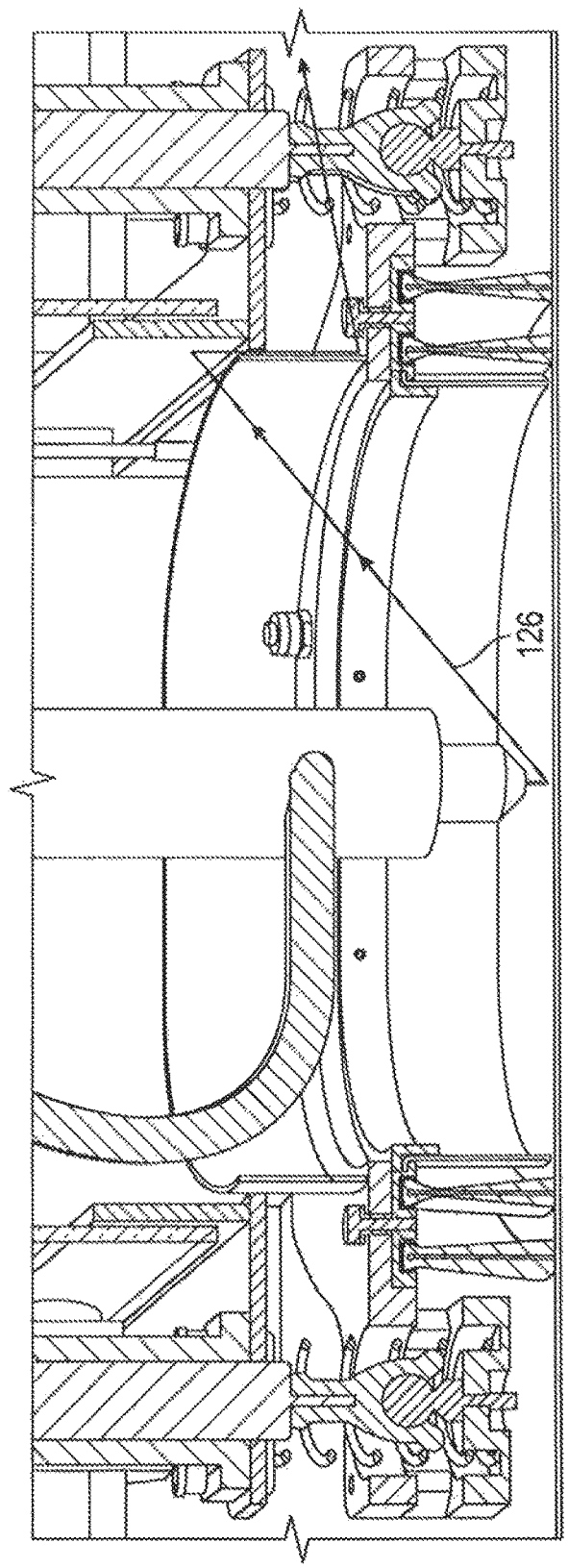
FIG. 14 illustrates a non-linear path, according to one embodiment of the present invention.

As will be appreciated, the bushes 66 themselves are formed from material, such as but not limited to rubber, that is both resiliently flexible as well as being able to maintain structural integrity even in high temperature environments. An interior, preferably fabric, liner 124 is disposed between the brushes 66 and the laser head 80, in order to protect the brushes from damage due to operation of the laser head 80. FIG. 14 shows the non-linear path 126 that light emanating from the laser head 80 must follow, in order to escape the protective enclosure of the present invention.

Figure 15:
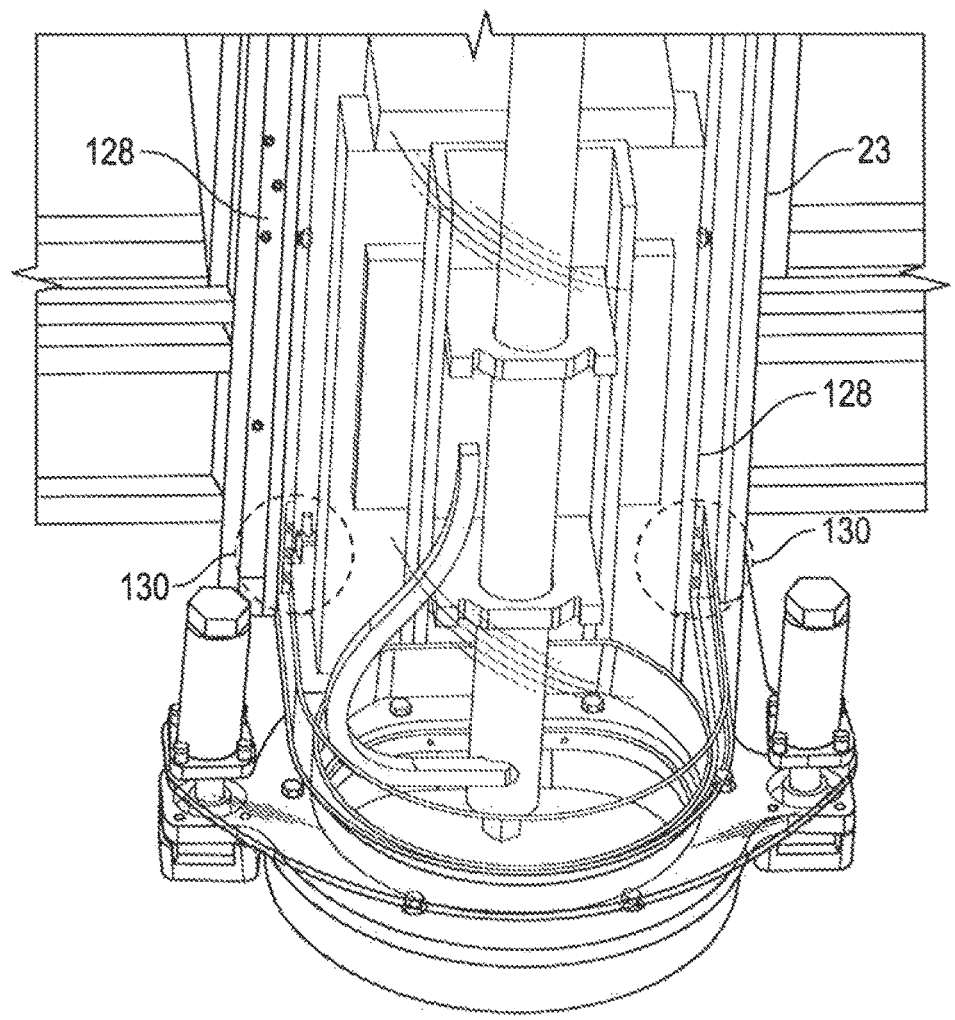
FIG. 15 illustrates a perspective view of the laser head assembly.

As discussed previously, one important aspect of the present invention is that the laser head 80 is much more easily accessible than known devices, and this additional functionality is shown in FIG. 15. As shown in FIG. 15, the light shield 23 is movably mounted to linear guides 128, which allow the light shield 23 to be moved up or down (to a raised, or lowered, position) for the quick adjustment of, e.g., the focus of the cutting beam, or the like. A pair of proximity sensors 130 are therefore utilized to determine if and when the light shield is in its lowered position, and only allows operation of the laser head 80 if the sensors 130 agree that the light shield is in the proper, protective (lowered) position.

As will be appreciated from a review drawing FIGS. 1-15 and their associated discussion, the present invention has developed a laser cutting apparatus for the manipulation of workpieces, preferably metal workpieces. However, in contrast to known devices, the present invention utilizes a protective enclosure about the laser head only, thereby leaving the majority of the apparatus open to inspection and manipulation, as necessary. Moreover, the present invention utilizes a series of integrated, safety switches, any of which can cause the operation of the laser head to be halted or prohibited, should any of these safety switches indicate an unsafe situation. These safety switches can of course be integrated with a machine-stop button, preferably in series, so as to make the operation of the laser head 80 as safe as possible.

Figure 16:
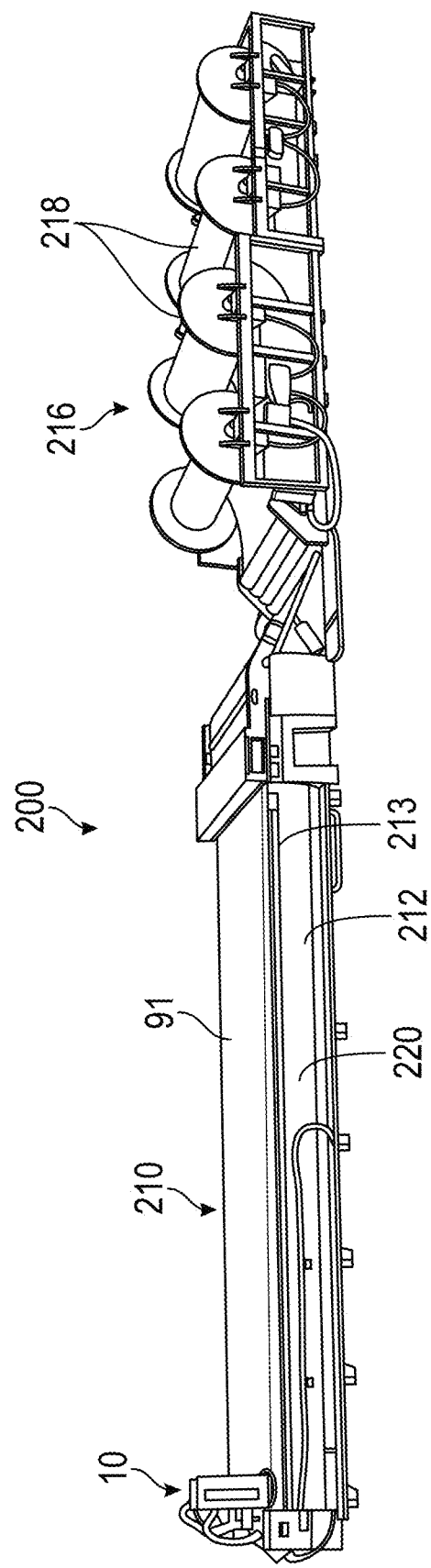
FIG. 16 is a perspective view of a laser cutting system according to an embodiment of the present invention.
Figure 17:
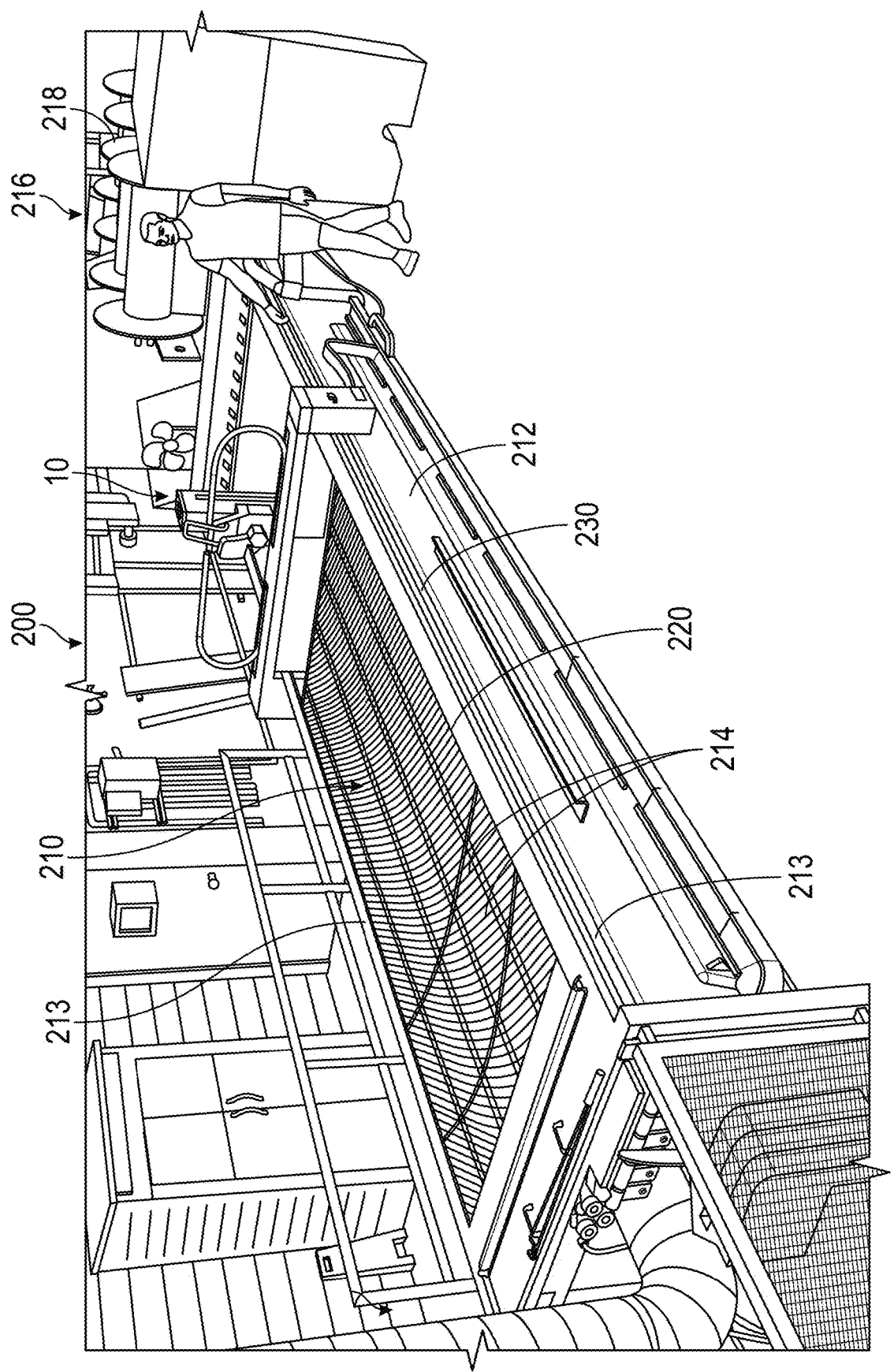
FIG. 17 is another perspective view of the laser cutting system of FIG. 16.

It is envisioned that the protection system 10 of the present invention may be incorporated into a variety of laser cutting systems known in the art. FIGS. 16 and 17 illustrate one such implementation of the protection system 10 with a laser cutting system 200. As shown therein, the laser cutting system 200 includes a cutting table or platen 210 having a frame 212 and a plurality of workpiece support elements 214 coupled to the frame for supporting a workpiece, such as workpiece 91. In an embodiment, the frame 212 may be comprised of a plurality of structural members 213 defining a generally rectangular-shaped frame 212. For example, the structural members 213 may be formed from steel tubes, although other configurations may be utilized without departing from the broader aspects of the invention. The table 210 is preferably a stationary table, although it is envisioned that the system 200 may include a movable table or platen without departing from the broader aspects of the invention. In an embodiment, the table 210 may be, for example, any of the cutting tables in the Vulcan® line of cutting systems offered by Mestek Machinery®.

As illustrated in FIGS. 16 and 17, the cutting system 200 may further include one or more coil stations 216 that receive rolls 218 of material for automated feeding onto the table 210. While FIGS. 16 and 17 depict a coil fed system, the system 200 may alternatively be configured as a sheet fed system.

As discussed above in connection with the protection system 10, the lasers of laser cutting machines are capable of emitting high levels of energy and can therefore be dangerous to the eyes and skin of its operator, and the random reflection of the laser light may be hazardous to operators in the vicinity of the machine. The protection system 10 of the present invention, as discussed above, sufficiently encapsulates the laser head so as to prevent or substantially minimize the escape of radiation and light from the laser that could be harmful to persons and structures surrounding the machine.

While the protection system 10 described herein substantially prevents the escape of light and radiation above the workpiece, in any direction, laser light and energy that passes through the workpiece 91 during the cutting operation is not encapsulated or captured by the protective enclosure of the protection system 10. In particular, light from the laser may pass through the workpiece and reflect off of the frame 212, including the structural members 213 and the support elements 214. While such light is typically contained beneath the workpiece 91 interior to the frame 212 of the table 210, such reflected light, over time, can damage the structural members 213 and/or the support elements 214. In addition, in some case, the light may reflect off of the frame and escape to the surrounding environment where it may be hazardous. To address this issue, protective sheets or panels 220 may be affixed to some or all of the structural members 213 of the frame 212, and/or the workpiece support elements 214. In the preferred embodiment, the protective panels 220 are mounted to all structural table members that are located over the effective cutting area. In an embodiment, the protective panels 220 may be secured to the structural members 213 by rivets, although other fastening means known in the art may also be utilized without departing from the broader aspects of the invention.

The protective panels 220 are preferably formed from a material that provides for a high degree of light absorption and minimal reflectivity (to absorb light from the laser head 80 and substantially minimize or prevent reflection). For example, in an embodiment, the panels 220 are flexible graphite sheets or panels having a thickness between about 1/32 inches and about 1/8 inches. In the preferred embodiment, the flexible graphite sheets have a thickness of approximately 0.060 inches. In one embodiment, the flexible graphite sheets have a density of approximately 70 lb/ft3, a maximum service temperature of approximately 850° F., a minimum service temperature of approximately −330° F., a thermal conductivity (parallel to the surface) of about 1532 BTU-in/hr-ft ° F. and a thermal conductivity (normal to the surface) of about 48 BTU-in/hr-ft ° F. While flexible graphite sheets have been discovered to provide optimal laser light absorption, other materials having similar properties and light absorption characteristics, may also be utilized without departing from the broader aspects of the invention.

In use, the flexible graphite panels 220 on the structural members of the system 200, as discussed above, absorb light from the laser during the cutting operation and does not allow it to reflect. The panels 22 also absorb the energy of the laser beam, preventing any residual damage to the structural members of the table 210. In a system incorporating graphite sheets on the structural members of the table, reflectivity of the laser beam has measured at less than 1% of the allowable light recommended by the FDA for fiber lasers. Like the minimalist protective enclosure 10, the protective panels 220 do not inhibit free and unobstructed loading and unloading of the workpiece onto and off the table (with existing systems, an operator would have to wait for the pallet shuttle to exit a typical protective enclosure apparatus).

While the embodiments described above disclose the use of protective panels that are attached to the frame, structural members and/or other components of the table to absorb light and energy from the laser (and minimize reflection), it is envisioned that in some embodiments, the frame, structural members, workpiece support elements and other components of the table may, themselves, be formed from a material or materials configured to absorb the laser light and energy and minimize reflection. In yet other embodiments, rather than utilizing protective panels, a protective material may be deposited on the frame, structural members and other components to increase light absorption and minimize reflection. The protective material may be for, example, a graphite material 230 that is sprayed on such components. Alternatively, the material 230 may be formulated as a liquid and the components dipped in the material or otherwise coated with the material to impart light absorption properties.

In view of the above, the present invention therefore provides a comprehensive protection system for a laser cutting machine that contains substantially all of the laser light and energy, either within protective enclosure 10, or through absorption using protective panels 220 attached to the frame and/or structural members of the table 210 supporting the workpiece. Taken together, the protection system of the present invention therefore provides a level of safety and ease of use heretofore not seen in the art.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A laser cutting system, comprising:
 a platen having a plurality of structural members defining a frame configured to receive a workpiece for a cutting operation;
 a laser torch head movable in relation to the platen to selectively cut the workpiece; and
 a protective material coating all exterior sides of at least one of the plurality of structural members of the frame, the protective material configured to absorb light and energy from the laser torch head during the cutting operation.

2. The laser cutting system of claim 1, wherein:
 the protective material is a graphite material.

3. The laser cutting system of claim 2, wherein:
 the protective material is a flexible sheet of graphite material.

4. The laser cutting system of claim 2, wherein:
 the protective material has a thickness between $\frac{1}{32}$ inches and $\frac{1}{8}$ inches.

5. The laser cutting system of claim 4, wherein:
 the protective material has a thickness of 0.060 inches.

6. The laser cutting system of claim 1, further comprising:
 a laser cutting tool having:
  a bridge;
  a top protection assembly;
  a middle protection shield assembly;
  a bottom protection assembly;
  the laser torch head;
 wherein the top protection assembly, the middle protection shield assembly, and the bottom protection assembly are removably mounted to the bridge; and
 wherein the top protection assembly, the middle protection shield assembly, and the bottom protection assembly form a cavity enclosing portions of the laser torch head and bridge.

7. The laser cutting system of claim 6, wherein:
 the middle protection shield assembly includes a light shield having a planetary gasket disposed on an edge of the light shield.

8. The laser cutting system of claim 7, wherein:
 the light shield is a semi-translucent shield permitting an operator of the laser cutting tool having a view of inside of the cavity.

9. The laser cutting system of claim 6, wherein:
 the frame of the laser cutting tool comprises at least one shield interlock switch, and the middle protection shield assembly is mounted to the bridge via contact with the shield interlock switch.

10. The laser cutting system of claim 9, wherein:
 the at least one shield interlock switch is in a locked position when the middle protection shield assembly is mounted to the bridge, and is switched to an unlocked position when the middle protection shield assembly is detached from the bridge;
 wherein the laser torch head can be activated only if all shield interlock switches are in the locked position.

11. The laser cutting system of claim 6, wherein:
 the top protection assembly comprises a top cover having
  a top cover opening;
  a top brush assembly; and
  wherein the top brush assembly covers the top cover opening, so as to prevent leaking of any laser light from the cavity.

12. A laser cutting system for manipulating a metal workpiece, comprising:
 a platen having a plurality of structural members defining a frame supporting the platen, the platen selectively receiving the metal workpiece for a cutting operation;
 a laser torch head movable in relation to the platen, configured to selectively cut the metal workpiece; and
 a flexible graphite material applied to all exterior sides of at least one of the plurality of structural members, the flexible graphite material absorbing light and energy from the laser torch head during the cutting operation.

13. The laser cutting system of claim 12, wherein:
the flexible graphite material is applied to all of the structural members that are located within an effective cutting area of the platen.

14. A laser cutting system for manipulating a metal workpiece, comprising:
- a platen having a plurality of structural members defining a frame configured to receive the metal workpiece for a cutting operation;
- a laser torch head movable in relation to the platen, configured to selectively cut the metal workpiece;
- a bridge;
- a top protection assembly;
- a middle protection assembly;
- a bottom protection assembly; and,
- wherein the top protection assembly, the middle protection assembly, and the bottom protection assembly are removably mounted to the bridge;
- wherein the top protection assembly, the middle protection assembly, and the bottom protection assembly form a housing enclosing a substantial portion of the laser torch head and bridge; and,
- a flexible graphite material applied to all exterior surfaces of at least one of the plurality of structural members, the flexible graphite material being configured to absorb light and energy from the laser torch head during the cutting operation.

\* \* \* \* \*